United States Patent

Siglow

[15] 3,663,834

[45] May 16, 1972

[54] CIRCUIT ARRANGEMENT FOR LEVEL SUPERVISION IN TRANSMISSION SYSTEMS WITH FREQUENCY-OR PHASE MODULATION

[72] Inventor: Joachim Siglow, Wolfratshausen, Germany

[73] Assignee: Siemens Aktiengesellschaft, Berlin, Munich, Germany

[22] Filed: July 28, 1970

[21] Appl. No.: 58,870

[30] Foreign Application Priority Data

July 29, 1969 Germany ......................P 19 38 510.5

[52] U.S. Cl. ..............................307/235, 307/290, 307/293, 328/67, 328/117

[51] Int. Cl. ..........................................................H03k 5/20

[58] Field of Search ..................307/235, 290, 293; 328/115, 328/116, 117, 150, 67

[56] References Cited

UNITED STATES PATENTS

| | | | |
|---|---|---|---|
| 3,456,201 | 7/1969 | Zrubek | 328/116 |
| 3,119,983 | 1/1964 | Carroll | 307/223 |
| 3,341,816 | 9/1967 | Davis | 328/116 |
| 3,011,128 | 11/1961 | Filipowsky | 328/117 |
| 3,327,230 | 6/1967 | Konian | 328/117 |

*Primary Examiner*—John S. Heyman
*Assistant Examiner*—David M. Carter
*Attorney*—Birch, Swindler, McKie & Beckett

[57] ABSTRACT

Circuitry is described for supervising the signal levels in frequency or phase modulation transmission systems by means of an evaluation circuit which emits a first signal if a predetermined threshold level is exceeded by the carrier frequency. A second signal is emitted if the carrier frequency undershoots said threshold level. A threshold circuit recognizes when the carrier frequency exceeds the predetermined threshold level and operates to actuate a first time element which is designed to determine whether the carrier signal has failed to reach the threshold level during a specified time period.

5 Claims, 3 Drawing Figures

CIRCUIT ARRANGEMENT FOR LEVEL SUPERVISION IN TRANSMISSION SYSTEMS WITH FREQUENCY-OR PHASE MODULATION

BACKGROUND OF THE INVENTION

This invention relates to a circuit arrangement for signal level supervision in transmission systems with frequency or phase modulation with an evaluation circuit which emits a first signal if a specified level threshold is exceeded by the carrier frequency and which emits a second signal if the carrier frequency goes below the threshold level.

In the transmission of modulated carrier data signals a circuit arrangement determines in the receiver whether the level of the transmission signal is sufficient to distinguish the transmitted message from any disturbance signals which may occur in the transmission. For this a particular receiving level is predetermined and a circuit arrangement for level supervision emits two output signals. One signal signifies that the predetermined threshold level is exceeded by the received carrier signal, while the other signal identifies the undershooting of the threshold level and blocks the output of the receiver used for message transmission.

In a prior art circuit arrangement a portion of the limited carrier signal is branched off, is rectified and conveyed to a transistor amplifier. The collector circuit of the transistor includes a relay which drops out if the level of the transmission channel decreases by a specified value below the operation level. Three relay contacts, respectively, take care of the blocking of the output circuit, provide an alarm release and provide an optical signaling. This level supervision circuit, however, responds to slight disturbances in the message transmission or during the blocked condition of the receiver output. Short disturbance impulses control the level supervision circuit, and thereby also the receiver output circuit.

An additional prior art circuit for level supervision operates to integrate the input alternating voltage over a specific period of time. An average direct current voltage results therefrom which in the case of the transmission of messages is not supposed to undershoot a predetermined threshold. If the direct current voltage undershoots or exceeds the level threshold during the time period over which the integral is taken, the output circuit emits, after the integral time period, the output signal corresponding to the level condition. However, this improved circuit arrangement also cannot distinguish in many cases between message signals and disturbance voltages. Although the chances for misindication can be reduced by an enlargement of the integration time, periods of wasted time result which, for example in semi-duplex operation, considerably lower the transmission speed.

It is an object of the invention to find a circuit arrangement for level supervision which offers a great reliability against false indications of a signal level caused by disturbance voltages on the transmission path. The circuit arrangement is to distinguish between data signal voltages and disturbance voltages at the receiver input.

SUMMARY OF THE INVENTION

The invention meets the above and other objects by providing a fast response threshold value circuit which recognizes the exceeding of the threshold level by the carrier frequency signal and actuates a first time element which determines whether during a specified period of time an undershooting of the threshold level occurs. In the case of an undershooting within the predetermined time period the output signal existing prior to the beginning of the exceeding of the threshold level remains available at the output of an evaluation circuit. In the case of undershooting of the threshold level by the carrier signal the fast response threshold value circuit actuates a second time element, which determines whether during a specified time period an exceeding of the level threshold occurs, and that in the case of an exceeding within the predetermined time period, at the output of the evaluation circuit the output signal existing prior to the beginning of the undershooting of the level threshold remains available. Each change in the predetermined time period which exceeds or undershoots the level threshold disconnects the actuated time element and actuates the other time element. Upon an exceeding or undershooting of the level threshold which continues during the predetermined time period, a signal, corresponding to this level condition, appears at the output of the evaluation circuit.

The circuit arrangement according to the invention requires no protracted integration to increase the reliability against mis-indication. The principle of the circuit arrangement uses the differing waveforms of data signal voltage as opposed to disturbance voltage. The data signals in frequency modulation and phase modulation systems possess, aside from the additional amplitude modulation, through a band de-limitation, equal signal energy for each message element. In contrast, pulse distorters cause alternating voltage impulses in the receiving filter which traverse the response threshold of the level supervision several times at the building up and phasing out processes. Therefore, at first a threshold value circuit which responds as quickly as possible is inserted which is able to detect short undershooting and exceeding of the response threshold. The subsequent switching stages are able to detect a data signal through the fact that the fast response threshold value circuit does not indicate a threshold value undershooting during a given time period. A further similar switching stage takes care that a short lowering of the level, resulting from an unfortunate superimposition of data signals and disturbance signals, does not lead to the indication of a level falling-off. Through the combination of two subsequent time elements with a flip-flop trigger circuit it is achieved that the flip-flop circuit assumes the on-condition only in the case of receiving signals which exist for a predetermined minimum time period. In the same manner short-period level reductions can be bridged over. An essential advantage of the circuit arrangement also resides in the considerable lowering of the undesired responding of the level supervision due to disturbance voltages on the transmission path, as long as no data signal is transmitted by the distant transmission station. The circuit arrangement is especially suited for data transmission over disturbance-prone lines, for example over dial connections in a telephone network where the exchange systems cause considerable disturbances. In practical experiments with this circuit arrangement and a comparison with known circuits it has been shown that the number of mis-indications, caused by disturbance voltages, decreases by a factor of from 150 to 200 when the new circuit is employed.

BRIEF DESCRIPTION OF THE DRAWINGS

The invention will be best understood by reference to the description of a preferred embodiment hereinbelow taken with the drawings in which.

DETAILED DESCRIPTION OF THE DRAWINGS

Figure 1:
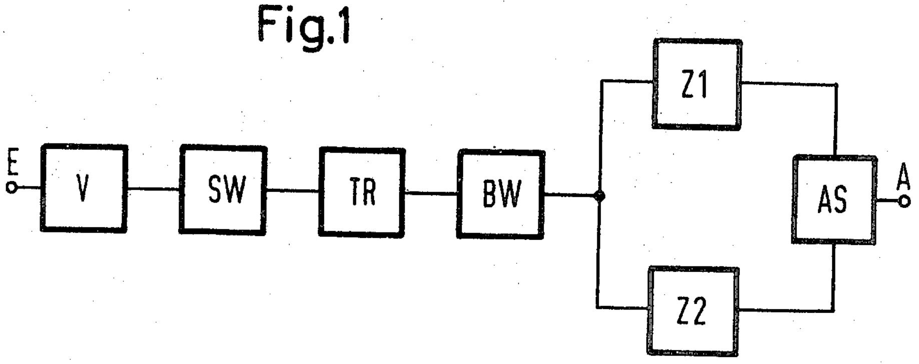
FIG. 1 is a block circuit diagram illustrating the principle of level supervision according to this invention.

FIG. 1 illustrates the principle of level supervision according to the invention. Input E receives the carrier data signal which is amplified in amplifier V. A subsequent threshold value stage SW responds at the exceeding or undershooting of a specific threshold level and controls a subsequently switched trigger circuit TR which forms rectangularly shaped impulses out of the carrier alternating voltage, the time duration whereof corresponds to approximately half the carrier frequency. At the undershooting of the threshold level, the trigger circuit switches into rest position and remains in this condition until the receiving level again exceeds the threshold level. The threshold value circuit SW can also be developed with two thresholds. There then exists an upper threshold at the exceeding whereof the trigger circuit generates impulses, while only at the undershooting of the lower threshold the impulse generation by the trigger circuit is stopped.

The trigger circuit controls with the impulses derived from carrier oscillation an impulse evaluation circuit BW. This impulse evaluation circuit possesses a loading capacitor of a value which provides a specific time constant for the operating voltage. Each impulse emitted by the trigger circuit discharges the capacitor, while in the interim between impulses, the capacitor is charged for the duration of that interim period. Upon the non-appearance of the trigger impulses due to an undershooting of the level threshold, the capacitor is charged to a greater value. At a specified amount of charge, the impulse evaluation circuit emits an impulse, i.e., a positive impulse at the exceeding of the level threshold and a negative impulse at the undershooting of the level threshold. The positive impulse, for example, controls time element Z1 and the negative impulse controls time element Z2. In each case only one of the two time elements is actuated, so that an alternating operation of the two time stages occurs. If the evaluation circuit emits a positive impulse, time element Z1 is actuated and after a specified pre-determined time period an impulse results at the output of the time element which controls a time element evaluation circuit AS into the position corresponding to the data level. The evaluation circuit emits at output A an on-condition voltage level (data level available), provided, however, that during the pre-determined time period no negative impulse appears at the output of the impulse evaluation circuit BW. If a negative impulse appears during the pre-determined time duration, i.e., an undershooting of the threshold level has occurred, time element Z1 is stopped immediately and time element Z2 is actuated. Thus, no influencing of evaluation circuit AS occurs. Now, if during the predetermined time period, beginning from the point in time of the actuation of time element Z2, no positive impulse occurs, time element Z2 emits a signal which switches the evaluation circuit AS into an off-condition voltage level, (data level is absent). After each stopping the appropriate time element is again started by the thereto pertaining impulse.

Figure 2:
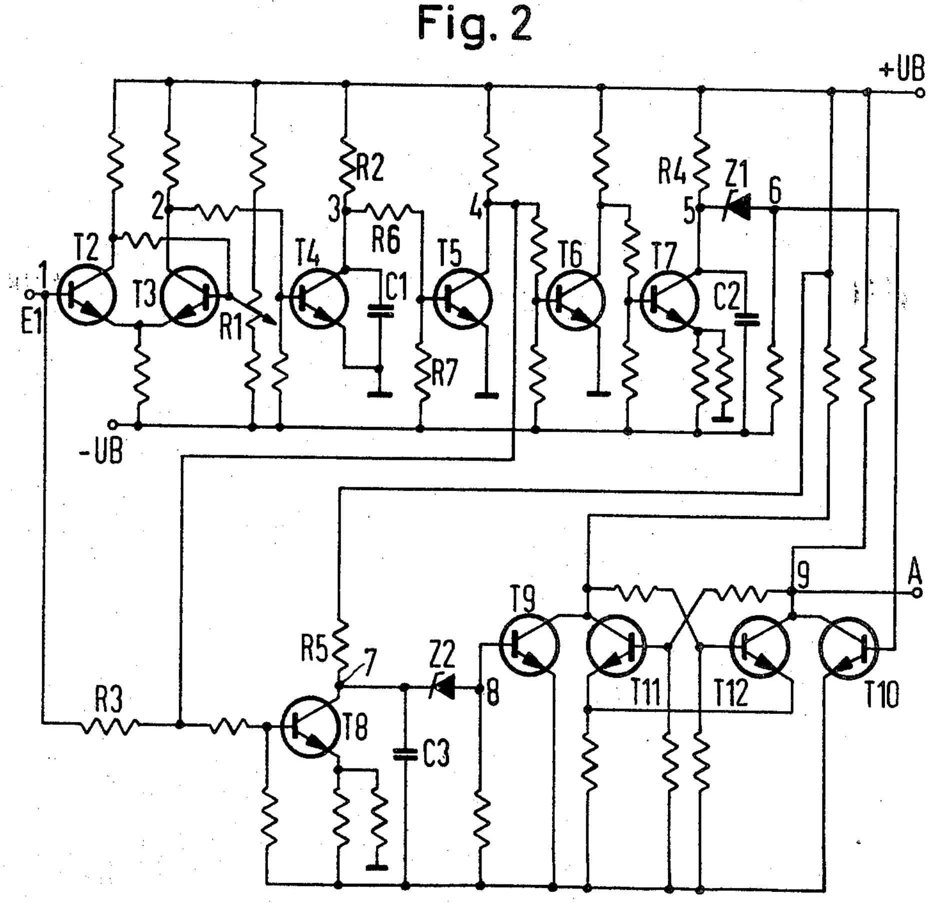
FIG. 2 is a schematic diagram of a circuit arrangement for a preferred embodiment of the invention.

FIG. 2 shows an advantageous exemplary circuit arrangement according to the invention which is distinguished by especially low cost. The circuit arrangement according to FIG. 2 possesses two response thresholds. The circuit responds to a first input level (for example −43 dBm) and indicates the on-condition at the output. At a second input level (for example −48 dBm) the circuit also responds and indicates at the output of the off-condition. Thereby a hysteresis results wherein the on-condition lies above the level value of the off-condition by a specific level difference.

The received alternating voltage signal for the driving of the level supervision circuit travels from a stage of the receiver's limiter amplifier (not shown) to inlet E1. The received signal must be taken off from a limiter amplifier where the preceding stages, at the input levels in the proximity of the thresholds for the responding and dropping out, do not yet operate within the limitation.

Figure 3:
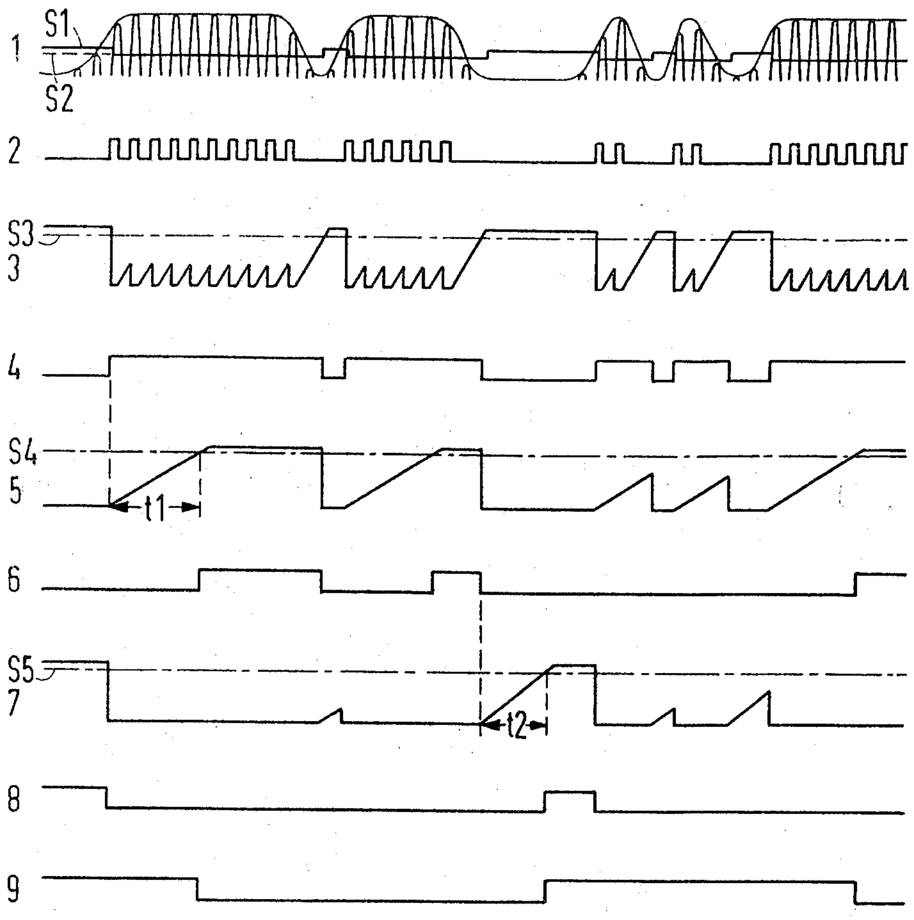
FIG. 3 is a pulse-time diagram for the circuit arrangement in FIG. 2.

Referring to FIG. 3 and line 1 the depicted waveform shows the signal lying at input E1. Line 1 shows the course of the signal, shown with the aid of the positive half-waves for low inlet levels. S1 represents the level response threshold, and S2 represents the level drop-out threshold.

The received signal travels, under certain circumstances, after intermediate switching of a separating stage to a Schmitt trigger circuit, consisting of transistors T2 and T3. The Schmitt stage scans the received signal, i.e., the stage switches upon exceeding of the threshold value by the alternating voltage into operation position and upon undershooting of the threshold value into rest condition. From the alternating voltage, there results the pulse train shown in line 2 of FIG. 3, which appears at the output of transistor T3. With the aid of the adjustable resistor R1 the response threshold for the Schmitt circuit can be set. The impulses (line 2, FIG. 3) control transistor T4 in each case for the duration of an impulse into the conductive state, so that the transistor is blocked between the impulses. During the blocked condition of transistor T4 capacitor C1 charges up with operating voltage +UB over resistor R2. A positive input impulse controls transistor T4 into the conductive state, so that capacitor C1 is short-circuited over the conducting switching path of the transistor. A rapid discharge of capacitor C1 occurs in response thereto. The voltage at capacitor C1 is shown in line 3 of FIG. 3. The charge time constant $R_1 C_1$ is selected in such a way that the charging of the capacitor does not reach, during an impulse period, the switching threshold (S3 in line 3, FIG. 3) of transistor T5. Upon the non-appearance of the positive impulses of the Schmitt stage for an extended period of time, the charging of capacitor C1 reaches switching threshold S3 (line 3 in FIG. 3) of transistor T5, which, as a consequence, becomes blocked. Only a positive impulse from the Schmitt stage is able to discharge capacitor C1 and to thereby control transistor T5 again into conductive condition. The output signal appearing at the collector electrode of transistor T5 is shown in line 4 in FIG. 3. The switching of the transistor T5 from the conducting state into the blocked state signifies the exceeding of drop-out threshold level S2 (line 1 in FIG. 3). After the undershooting of the drop-out threshold level an exceeding of the response threshold level takes place.

After the undershooting of the lower or drop-out threshold level, transistor T5 is in blocked condition and over resistor R3 a feedback is effected from the collector of transistor T5 for the duration of the blocked state, which feedback creates at the input of transistor T2 the response threshold S1 (line 1 in FIG. 3). Due to the feedback over resistor R3 a transfer of the drop-out threshold to the response threshold occurs, and thus, a hysteresis results between connection and disconnection.

The evaluation of the outlet signals appearing at the output of transistor T5 (line 4, FIG. 3) is carried out by two time elements and an evaluation circuit.

Upon the exceeding of the response threshold S1 (line 1 in FIG. 3) there results at the output of transistor T5 a positive-going waveform which switches, over transistor T6, transistor T7 into the blocked state. Thereby the time element which is assigned to the response threshold and consists of resistor R4 and capacitor C2 is actuated. Capacitor C2 charges up over resistor R4. With the aid of a Zener diode Z1 a specific voltage threshold is set. The charging of the capacitor is shown in line 5 of FIG. 3 and the voltage threshold through the Zener diode is designated S4. Undershooting of the drop-out threshold produces a negative-going waveform in the output signal of transistor T5, and it controls transistor T7 into the conductive state, so that capacitor C2 is discharged very rapidly towards ground. Threshold S4 can only be reached if during the entire time duration $t1$ (line 5 in FIG. 3) the voltage value for the exceeding of the response threshold is emitted by the fast response threshold value circuit. If capacitor C2 is discharged, as is the case at the arrival of a disturbance voltage, it must again be charged up all over after the disturbance voltage has ceased. The voltage appearing behind the Zener diode Z1 is shown in line 6 of FIG. 3. This voltage controls transistor T10, which influences in direct current fashion transistor T12. Transistors T11 and T12 form a flip-flop circuit which assumes two stable positions (on-state and off-state) and is recontrolled in direct current fashion by the two transistors T9 and T10. Responsive to the position of the flip-flop circuit two different output signals appear at output A. The one output signal corresponds to the condition where the response threshold is exceeded by the level, while the other outlet signal signifies the level condition upon undershooting of the drop-out threshold.

At the undershooting of the drop-out threshold S2 (line 1 in FIG. 3) there results at the output of transistor T5 a negative impulse. This impulse causes the capacitor C2 to quickly discharge and causes transistor T8 to switch to a blocked condition. Thus, capacitor C3 can charge up over resistor R5. Upon the non-appearance of the level, capacitor C3 charges up until threshold S5, which is given through the Zener diode Z2, is reached. The voltage resulting at capacitor C3 is shown in line 7 of FIG. 3. The time which passes until threshold value S5 is reached is designated by $t2$. Behind the Zener diode Z2, results the voltage indicated in line 8 of FIG. 3, which controls transistor T9. Transistor T9 influences, in direct current fashion, the flip-flop circuit with transistors T11 and T12.

As is shown in line 9 of FIG. 3, in each case a positive-going waveform of the output signal controls, after the Zener diode Z1, (line 6 in FIG. 3) transistor T10 and thereby also transistor T12. In the same manner a positive-going edge of the output signal controls, after Zener diode Z2, (line 8 in FIG. 3) transistor T9 and thereby also transistor T11. Thus, the flip-flop circuit switches back and forth between the two positions. However, the flip-flop circuit can be switched only after the time duration $t1$ in case of exceeding, and after the time duration $t2$ in case of undershooting of the corresponding threshold level.

The flip-flop circuit stores the level condition, so than an emission of the level condition takes place at output A when the fast response threshold value circuit indicates no level change after an exceeding during time period $t1$ and after an undershooting during time period t2. After an exceeding of the response threshold by the level, the flip-flop circuit can be switched only by an undershooting of the drop-out threshold which lasts during period t2. On the other hand at an undershooting of the drop-out threshold by the level, only the exceeding of the response threshold, which lasts during the entire period t1, can switch the flip-flop circuit. Level changes of short time durations which exceed, or undershoot, the two thresholds, as is shown in line 1 of FIG. 3, can effect no change in the outlet signal (line 9 in FIG. 3) of the flip-flop circuit.

The foregoing description of a preferred embodiment of this invention is considered to be only exemplary, and it is contemplated that changes and modifications may be made within the scope of the appended claims.

I claim:

1. Apparatus for the evaluation of signal levels and for indicating the exceeding and undershooting of at least one threshold level for predetermined periods of time comprising:

first switching circuit means for receiving the signal to be evaluated and for switching to a first state producing a first signal value upon the exceeding of said threshold level by the signal to be evaluated and for switching to a second state producing a second signal value when the signal to be evaluated undershoots said threshold level, first timing circuit means coupled to said first switching circuit means including a first charging circuit responsive to said first signal to charge to a first amplitude in a first predetermined time period, second timing means coupled to said first switching circuit means including a second charging circuit responsive to said second signal to charge to a second amplitude in a second predetermined time period and second switching means coupled to said first and second timing means, said switching circuit being switched to a first state when said first amplitude is reached by said first charging circuit and being switched to a second state when said second charging circuit reaches said second amplitude.

2. The apparatus defined in claim 1 wherein said charging circuits comprise R-C circuits, the time constants of which determine said time periods.

3. The apparatus defined in claim 1 wherein said charging circuits are connected to said second switching means over, respectively, first and second Zener diodes, said first and second amplitudes being determined, respectively, by said Zener diodes.

4. The apparatus defined in claim 1 further comprising:

a switch having a predetermined threshold for switching between conducting and non-conducting states, third charging circuit means connecting said first switching means to said switch, said switching of said switch being responsive to the charging level of said third charging circuit and means connecting said first timing means to said switch in such manner that said first signal is connected to said first timing circuit when said switch is in the conducting state and said second signal is connected to said second timing means when said switch is in the non-conducting state.

5. The apparatus defined in claim 1 wherein said first switching circuit means comprises a Schmitt circuit including means for adjusting the switching level thereof.

* * * * *